US 8,386,564 B2

(12) United States Patent
Pennington

(10) Patent No.: US 8,386,564 B2
(45) Date of Patent: Feb. 26, 2013

(54) METHODS FOR DETERMINING A REPUTATION SCORE FOR A USER OF A SOCIAL NETWORK

(75) Inventor: Havoc Pennington, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 576 days.

(21) Appl. No.: 11/564,998

(22) Filed: Nov. 30, 2006

(65) Prior Publication Data

US 2008/0133657 A1     Jun. 5, 2008

(51) Int. Cl.
*G06F 15/16*     (2006.01)
(52) U.S. Cl. ............ 709/204; 709/203; 709/223; 725/16
(58) Field of Classification Search .................. 709/203, 709/204, 224, 223; 705/37, 10; 725/16
See application file for complete search history.

(56) References Cited

U.S. PATENT DOCUMENTS

| | | | |
|---|---|---|---|
| 5,566,291 A * | 10/1996 | Boulton et al. ............... 715/709 |
| 7,428,505 B1 * | 9/2008 | Levy et al. ....................... 705/37 |
| 7,558,769 B2 * | 7/2009 | Scott et al. ....................... 706/20 |
| 7,716,079 B2 * | 5/2010 | Hanif et al. ..................... 705/10 |
| 2005/0149383 A1 * | 7/2005 | Zacharia et al. ................ 705/10 |
| 2005/0278540 A1 * | 12/2005 | Cho et al. ....................... 713/182 |
| 2006/0009994 A1 * | 1/2006 | Hogg et al. ......................... 705/1 |
| 2006/0064343 A1 * | 3/2006 | Burke et al. .................... 705/10 |
| 2006/0271438 A1 * | 11/2006 | Shotland et al. ................. 705/14 |
| 2007/0203781 A1 * | 8/2007 | Kerschbaum et al. .......... 705/10 |
| 2008/0005223 A1 * | 1/2008 | Flake et al. ..................... 709/203 |
| 2008/0015925 A1 * | 1/2008 | Sundaresan ..................... 705/10 |
| 2008/0109491 A1 * | 5/2008 | Gupta ......................... 707/104.1 |
| 2008/0127331 A1 * | 5/2008 | Seidman et al. ................ 726/21 |
| 2008/0235721 A1 * | 9/2008 | Ismail et al. .................... 725/16 |
| 2011/0041075 A1 * | 2/2011 | Cierniak et al. ............... 715/745 |

OTHER PUBLICATIONS

Jensen et al., "Finding Others Online: Reputation Systems for Social Online Spaces", Apr. 2002, CHI letters, vol. 4 Issue 1, pp. 447-454.*
Hogg et al., "Enhancing Reputation Mechanisms via Online Social Networks", 5th ACM Conference on Electronic Commerce, May 2004, pp. 236-237.*

* cited by examiner

*Primary Examiner* — Ramy M Osman
(74) *Attorney, Agent, or Firm* — Lowenstein Sandler LLP

(57) ABSTRACT

Embodiments of the present invention provide methods and systems for assigning a "karma" to users of a social network. In some embodiments, the karma is a score that is based on various reputations and feedback on a user. For example, reputation or feedback scores given to user in general are collected. In addition, karma is based on scores collected by analyzing feedback provided between two users. Thus, a reputation score for one from the point of view of the others may be calculated. Embodiments of the present invention provide an open interface (API) that allows users to submit their reputation scores.

6 Claims, 4 Drawing Sheets

METHODS FOR DETERMINING A REPUTATION SCORE FOR A USER OF A SOCIAL NETWORK

DESCRIPTION OF THE INVENTION

1. Field of the Invention

The present invention relates to online services and communications tools and, more particularly, to social networks. In addition, the present invention relates to maintaining online reputations.

2. Background of the Invention

In its short history, Internet usage has been mainly driven by portals and search engines, such as Yahoo! and Google. Recently, the rapid growth of social networking sites, such as MySpace and Facebook, has revealed a new trend of Internet usage. Social networking generally relates to services and tools that help users maintain and expand their circles of friends usually by exploiting existing relationships. Social networking sites have shown potential to become the places on the Internet where many people spend most of their time, thus making these sites the main entry point for online activity. Often times, these social networking sites can become the focal point of sharing information, such as links, multimedia, music, and the like.

In general, social networking sites and other online services of the Internet offer a mix of features and tools, such as message boards, games, journals or web logs ("blogs"). Many of these sites try to build communities around multi-media or popular culture, such as television, film, music, etc. These sites and their features are designed to keep users clicking on advertising-supported pages of the site. Thus, the known social networking sites employ a closed platform of services that attempt to keep their user-base captive to the site.

Unfortunately, it can be difficult for users to maintain their multiplicity of accounts for their social networks. For example, users can have multiple profiles at multiple sites for their music, email, instant messaging, etc. However, most users eventually do not keep up with all of their accounts. For example, many users have four or five e-mail addresses, but essentially may use only one or two of them.

In addition, the Internet is crowded with a large number of social networking sites and sharing tools. For example, the recent supremacy of iTunes has triggered a plethora of music service offerings. As another example, the recent success of YouTube and Google Video has sparked an explosion of video-sharing sites.

Unfortunately, due to their current business model, the known social network sites are vulnerable to spammers and other forms of fraud. This makes establishing trustful reputations a difficult process. Thus, many closed social networking sites will likely become abandoned or a major hassle for users to maintain.

Accordingly, it may be desirable to provide methods and systems that serve as an open platform for users to maintain their personas across a plurality of social networking sites and online services. It may also be desirable to provide methods and systems that serve as an open overlay that allows users to establish and maintain their reputations.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide methods and systems for assigning a "karma" to users of a social network. In some embodiments, the karma is a score that is based on various reputations and feedback on a user. For example, reputation or feedback scores given to user in general are collected. In addition, karma is based on scores collected by analyzing feedback provided between two users. Thus, a reputation score for one from the point of view of the others may be calculated. Embodiments of the present invention provide an open interface (API) that allows users to submit their reputation scores.

Reference will now be made in detail to the exemplary embodiments of the invention, which are illustrated in the accompanying drawings. Wherever possible, the same reference numbers will be used throughout the drawings to refer to the same or like parts.

Figure 1:
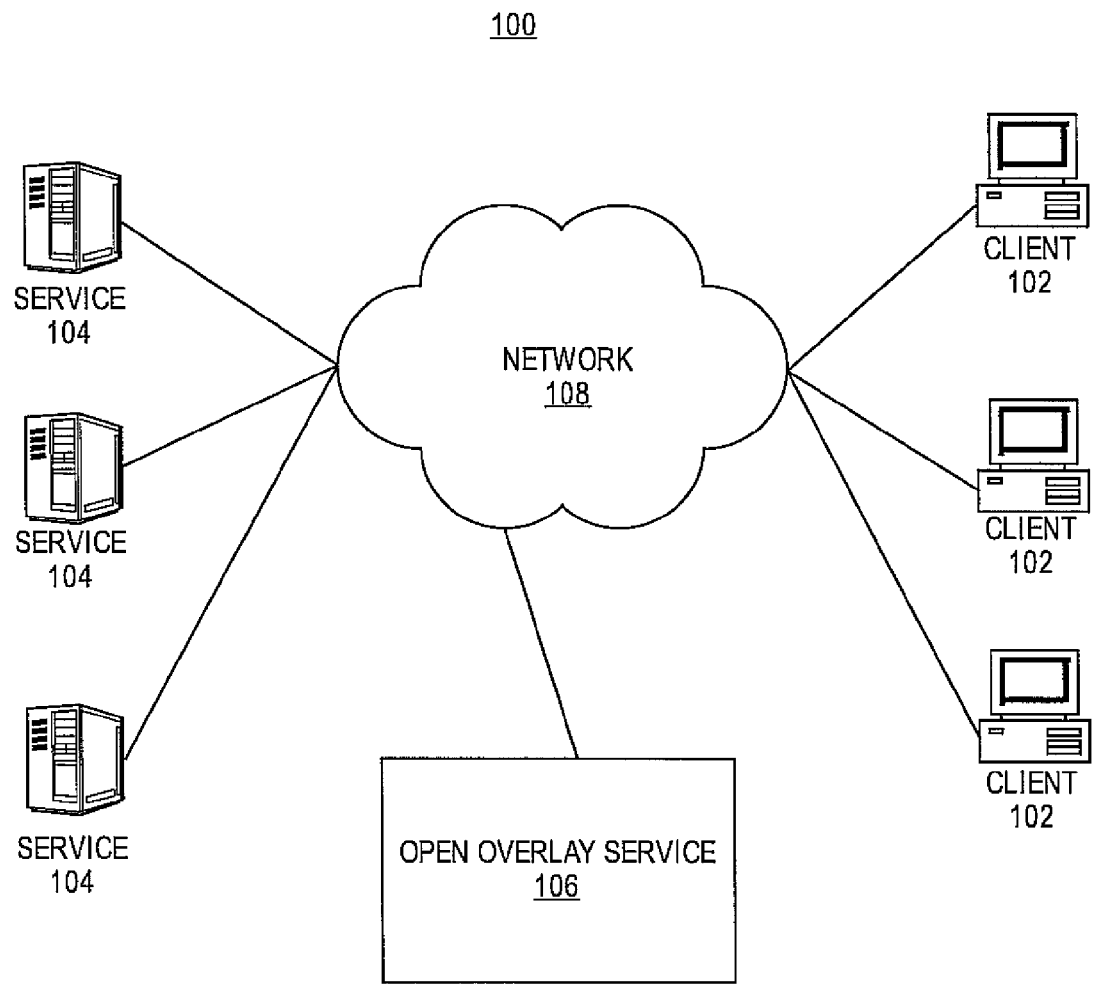
FIG. 1 illustrates an exemplary system that is in accordance with embodiments of the present invention.

FIG. 1 illustrates a system 100 that is consistent with the principles of the present invention. As shown, the system 100 may comprise one or more clients 102, a plurality of services 104, an open overlay service 106, and a network 108. In general, system 100 may be implemented on a widely available data network, such as the Internet. For example, system 100 may be implemented as a combination web site and client application that enables users and friends to participate in a live social context. These components will now be generally described.

Client 102 provides a user interface for system 100. Client 102 may be implemented using a variety of devices and software. For example client 102 may be implemented on a personal computer, workstation, or terminal. In addition, client 102 may run under an operating system, such as the LINUX operating system, the Microsoft™ Windows operating system, and the like. Client 102 may also operate through an Internet browser application, such as Firefox by Mozilla, Internet Explorer by Microsoft Corporation, or Netscape Navigator by Netscape Communications Corporation.

One skilled in the art will also recognize that client 102 may be implemented with various peripheral devices, such as a display, one or more speakers, and other suitable devices. Client 102 may also be implemented with various peripherals for accepting input from a user, such as a keyboard, a mouse, and the like. Although FIG. 1 shows a number of clients 102, system 100 may include any number of clients.

Services 104 are the applications and services that users of system 100 already use. Services 104 may be implemented on one or more servers that are well known to those skilled in the art. Rather than recreating functionality, open overlay service 106 merely interfaces services 104 and allows users to seamlessly continue using the services, such as social networking services, instant messaging, etc., that they currently use. Examples of services 104 include iTunes, Yahoo Music Engine, MySpace, Friendster, AOL Instant Messenger, Yahoo! Messenger, etc. Any sort of online service may be incorporated into the context provided by open overlay service 106.

Open overlay service 106 serves as a social network service and stores, manages, and provides access control to the various services and social networks of clients 102. In general, open overlay service 106 is essentially a web site and application service that stores and forwards information shared by users, as well as user profiles and social network information. Open overlay service 106 may be hosted as a public instance, similar in fashion to a service, such as Wikipedia. In addition, open overlay service 106 may provide various application programming interfaces that have an open specification so that anyone can create an interface.

For example, open overlay service 106 may process requests to retrieve an object, document, image file, web page, and the like. Open overlay service 106 may be implemented using a variety of devices and software. For example, open overlay service 106 may be implemented as a web site running on one or more servers that support various application programs and stored procedures.

The components of system 100 may be coupled together via network 108. Network 108 may comprise one or more networks, such as a local area network, the Internet, or other type of wide area network. In addition, network 108 may support a wide variety of known protocols, such as the transport control protocol and Internet protocol ("TCP/IP") and hypertext transport protocol ("HTTP").

Figure 2:
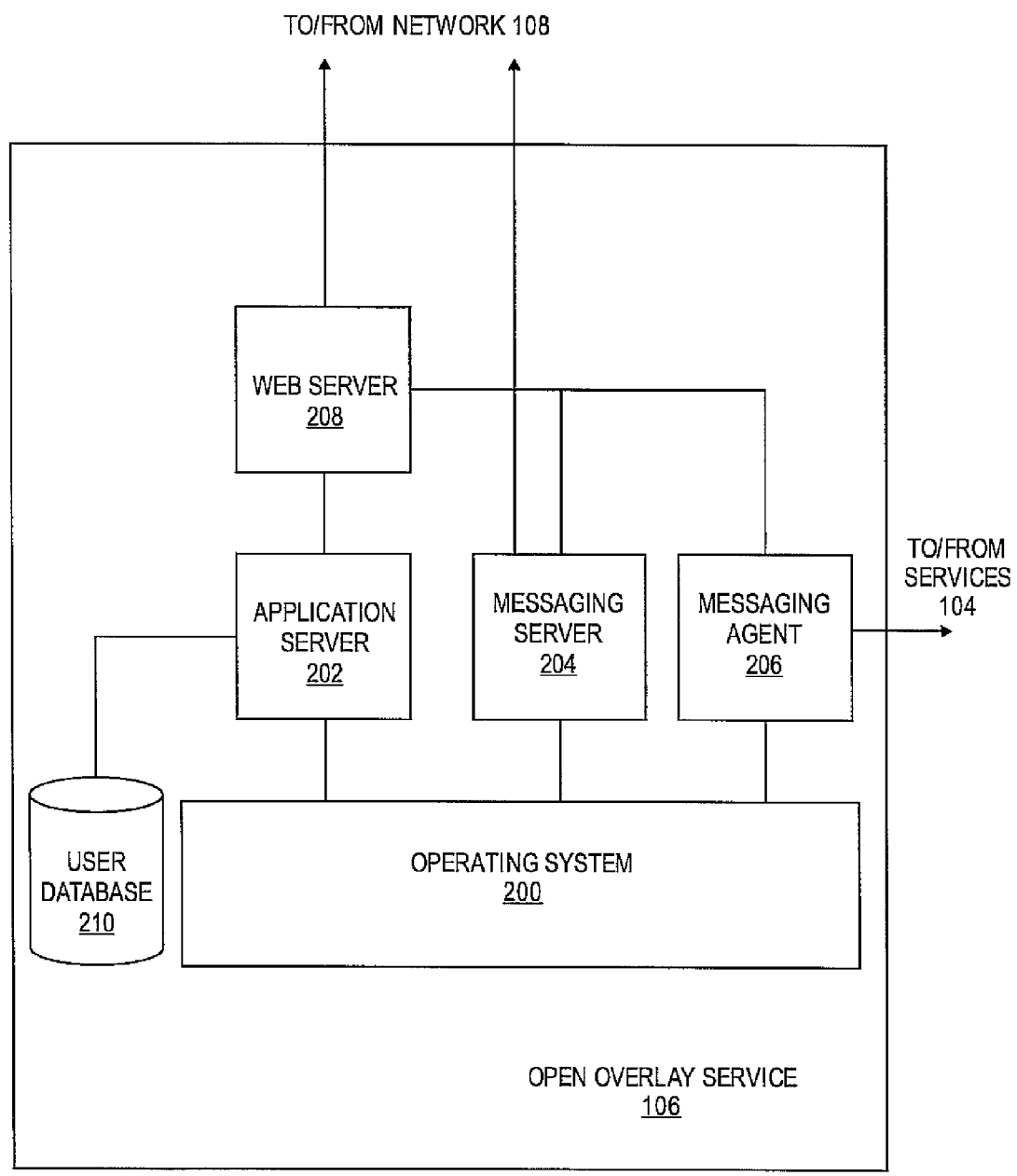
FIG. 2 illustrates an exemplary architecture for an open overlay service that is consistent with the principles of the present invention.

FIG. 2 illustrates an exemplary architecture for open overlay service 106 that is consistent with the principles of the present invention. As shown, open overlay service 106 may comprise an operating system 200, an application server 202, a messaging server 204, a messaging agent 206, a web server 208, and a user database 210. These components may be implemented as software, firmware, or some combination of both, which may be loaded into memory of the machine embodying open overlay service 106. The software components may be written in a variety of programming languages, such as C, C++, Java, etc. These components will now be generally described.

Operating system (OS) 200 is an integrated collection of routines that service the sequencing and processing of programs and applications running in open overlay service 106. OS 200 may provide many services, such as resource allocation, scheduling, input/output control, and data management. OS 200 may be predominantly software, but may also comprise partial or complete hardware implementations and firmware. Well known examples of operating systems that are consistent with the principles of the present invention include the Linux operating system, the UNIX operating system. In addition, OS 200 may operate in conjunction with other software, such as an application server, such as JBoss, to implement various features of open overlay service 106.

Application server 202 provides the logic for analyzing and managing the operations of open overlay service 106. As previously noted, application server 202 may be written in a variety of programming languages, such as C, C++, Java, etc.

For example, one responsibility of application server 202 may be managing the various identities of the users of open overlay service 106. As noted previously, a single person may have multiple identities that they use for various online services and social networks. For example, a person named, John Smith, may use jsmith@domain.com as an identity one service, but use smithj@domain2.com as his identity on another service.

In one embodiment, in order to track the various users of open overlay service 106, application server 202 may assign each user a unique identifier, such as a numeric identifier. Application server 202 may then utilize this unique identifier with the identity resources (i.e., email address, account names, screen names, etc.) used by services 104 to identify a person. In some embodiments, application server 202 generates a graph of each social network within open overlay service 106 in terms of person's names and the identity resources from the point of view of a particular user based on what is trusted by that user.

For example, given information about a person's name, their unique identifier assigned by application server 202, and associations to identity resources trusted by other users, application server 202 can generate a list of person names and identity resources (i.e., email address, account names, etc.) that should be visible to a particular user. Hence, the particular user will only be allowed to see identity resources they happen to (or only) know about that user and identity resources that have been verified by application server 202. For example, a user A may have a unique identifier of 2345, and email address #1 and email address #2 as identity resources. A user B may only know about email address #1 for user A. Meanwhile, a user C may similarly only know about email address #2 for user A. Thus, for user B, application server 202 will only allow user B to view and use email address #1 as an identity resource for user A. Likewise, application server 202 will only allow user C to view and use email address 42 as an identity resource for user A. However, if user A subsequently explicitly indicates to application server 202 that both users B and C can be trusted, then users B and C will then be also allowed to view both email addresses #1 and 2, as well. The primary uses of this information by open overlay service 106 may be for sharing a link with person by addressing that person either by an email address or by a short nickname, or for viewing a list of persons in open overlay service 106 that they think they know.

Application server 202 may also determine what information of a user should be public or private. In some embodiments, application server 202 may default to making information public, but provide an option, such as a checkbox, that allows the user to designate information as private. Application server 202 may also employ per page settings, such as all private or all public. Other privacy policies may be implemented by application server 202.

Application server 202 may further provide various search features. For example, application server 202 may allow users to search for other users based on various criteria, such as age, gender, school, etc. Application server 202 may also allow searches for various resources, such as email addresses, topics, links, etc.

Messaging server 204 manages communications between open overlay service 106 and clients 102 via network 108. For example, messaging server 204 may be configured to periodically poll clients 102 on a regular basis and have them request information from services 104. Messaging server 204 may be implemented based on well-known hardware and software and utilize well-known protocols, such as TCP/IP, hypertext transport protocol, etc.

Messaging server 204 may be configured to handle a wide variety of data and may handle data that is in any format. For example, information from clients 102 may be in the form of an extensible markup language (XML) file or a network location, such as a uniform resource locator (U&R) on the Internet. Alternatively, messaging server 204 may be configured to obtain information from services 104 directly in a peer-to-peer fashion.

Messaging agent 206 serves as an interface between open overlay service 106 and online services 104 and may operate to monitor the activity of clients 102 at these services. In particular, messaging agent 206 may be a relatively small and focused computer application (or "bot") that runs continuously, in the background simultaneously for each of clients 102, as other programs are being run, and responds automatically to activity on services 104 that may be of interest to clients 102, such as new messages, postings, and the like.

Messaging agent 206 may be created by open overlay service 106 (i.e., by application server 202) for the benefit of the users at clients 102. Alternatively, for example, messaging server 204 may send information to clients 102 upon request, perform automated searches, or monitor messages or events at services 104.

In one embodiment, messaging server 204 and/or messaging agent 206 may work in conjunction to perform client-side data scraping on services 104. Client-side data scraping may be desirable in some instances where services 104 refuse or block a direct interface with open overlay service 106. For example, MySpace and AOL's instant messaging service may be implemented as one of services 104, but is known to block proxy requests for a client.

Client-side data scraping may be initiated by messaging server 204 or using information provided by messaging server. Messaging server 204 may poll client overlay client 302 to trigger a request to one of services 104. Accordingly, overlay client 302 may cause one of service applications 306 to interface with service 104 and request data from that service, such as web page refresh. Since the request originated from client 102, service 104 will provide a response. Overlay client 302 may detect this response and forward it to messaging server 204. Messaging server 204 may then pass this response. Of course, the polling may be configured at overlay client 302 based on information provided to messaging server 204.

Messaging server 204 evaluates the response and determines if a notification event is needed. If notification is needed, messaging server 204 send a message to overlay client 302. The notification may then be displayed to the user using, for example, browser 304 or service application 306.

One application of client-side data scraping may be used to detect when messages or postings have been entered on one of services 104. For example, on MySpace, users often repeatedly refresh their pages in anticipation of receiving a post or message from a friend. With client-side data scraping, open overlay service 106 may automatically perform this function, and more conveniently, indicate when the user has received activity on their MySpace page. This notification may appear in the form of a pop-up bubble or may be displayed as a link on the user's page in open overlay service 106. Of course, other applications of client-side data scraping are consistent with the principles of the present invention.

Web server 208 provides a communications interface between open overlay service 106, clients 102, and services 104. For example, web server 208 may be configured to provide information that indicates the status of client 102. Such communications may be based on well known protocols and programming languages, such as HTTP, TCP/IP and Java. Interfaces provided by web server 208 may be implemented using well known Internet technologies, such as web pages, which are well known to those skilled in the art.

User database 210 maintains information identifying users and clients 102. User database 210 may be implemented using well known database technology, such as relational databases, or object oriented databases.

For example, user database 210 may include information indicating one or more operating systems and applications installed on clients 102 as well as services subscribed to by users. User database 210 may also comprise information related to authenticating a user determining the respective rights of a user relative to other users. For example, a user may select various groups or channels of content in which they are interested in receiving information. User database 210 may further include information that indicates the permissions and delivery of the information to clients 102. Other information that may be included in user database 210 may comprise information, such as system and individual permissions of clients 102 on services 104, activation keys, registration information, and payment information (such as credit card information).

Furthermore, user database 210 may include other information related to the manner in which open overlay service 106 communicates with clients 102. For example, this information may relate to periodicity of notifications, email addresses, format of the information, and the like. User database 210 may include data structures to log the activities and transactions of its users. Activities, such as recent links, history of operations, etc., that may be logged in user database 210 are well known to those skilled in the art.

Figure 3:
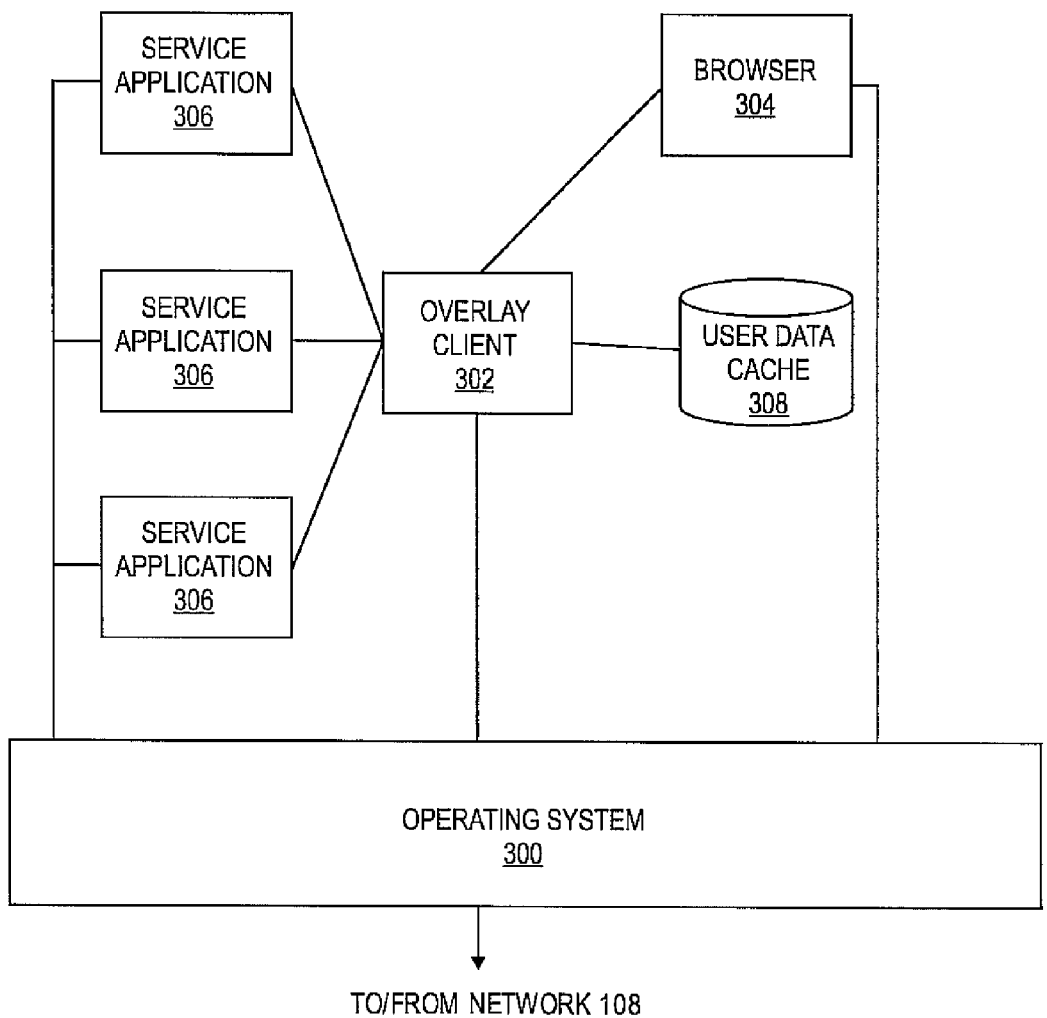
FIG. 3 illustrates an exemplary architecture for clients that are consistent with the principles of the present invention.

FIG. 3 illustrates an exemplary architecture for clients 102 that are consistent with the principles of the present invention. As noted, clients 102 may be implemented on a conventional device, such as personal computer, laptop, and the like. Such devices are well known to those skilled in the art and may typically include hardware, such as a processor, a memory, a display, a storage device, a keyboard, a mouse, and a network interface for network 108. Such hardware supports the operation of various components software. As shown, the software running on client 102 may comprise an operating system 300, an overlay client 302, a browser 304, one or more service applications 306, and a user data cache 308. Each of these software components will now be generally described.

Operating system (OS) 300 is an integrated collection of routines that service the sequencing and processing of programs and applications running in open overlay service 106. OS 300 may provide many services, such as resource allocation, scheduling, input/output control, and data management. OS 300 may be predominantly software, but may also comprise partial or complete hardware implementations and firmware. Well known examples of operating systems that are consistent with the principles of the present invention include Mac OS by Apple Computer, the Windows family of operating systems by Microsoft Corporation, and the Linux operating system.

Overlay client 302 maintains an inventory of the software and service applications 306 installed on client 102 and archives one or more states of activity on client 102. In some embodiments, overlay client 302 may be configured to periodically connect to open overlay service 106 and perform various operations requested by open overlay service 106.

Browser 304 is an application that runs on client 102 and provides an interface to access information on network 108, such as information on services 104. Browser 304 may be implemented as well known programs, such as Mozilla Firefox, Microsoft Internet Explorer, Netscape Navigator, and the like.

Service applications 306 run on client 102 to support the services provided by services 104. For example, service applications 306 may be applications, such as a browser, an instant messaging client, a music player (such as iTunes), and the like that are provided from services 104. Other examples for applications 306 are well known to those skilled in the art.

User data cache 308 provides a cache that indicates the activity of a user at client 102. For example, user data cache 308 may include information that indicates documents, such as HTML pages, images, URL links, web site access times, and the like.

In order to illustrate some of the features of open overlay service 106 that provide a live social context, a feature for maintaining a user's "karma" will now be described. A user's karma is a score that is based on various reputations and feedback on that user. For example, reputation or feedback scores given to user in general are collected. In addition, karma is based on scores collected by analyzing feedback provided between two users. Thus, a reputation score for one from the point of view of the others may be calculated. Embodiments of the present invention provide an open interface (API) that allows users to submit their reputation scores.

Given a user's email address or other unique IDs, application server 202 will return a reputation score as part of that user's karma. In addition, given two names or other unique IDs, application server 202 can provide a reputation score for one from the point of view of the others.

One responsibility of application server 202 is managing the various identities of the users of open overlay service 106. In some embodiments, a single person may have multiple identities that they use for various online services and social networks. For example, a person named, John Smith, may use jsmith@domain.com as an identity one service, but use smithj@domain2.com as his identity on another service.

In one embodiment, in order to track the various users of open overlay service 106, application server 202 may assign each user a unique identifier, such as a numeric identifier. Application server 202 may then rely on the identity resources (i.e., email address, account names, screen names, etc.) used by services 104 to identify a person. In some embodiments, application server 202 then generates a graph of each social network within open overlay service 106 in terms of person's names and the identity resources from the point of view of a particular user based on what is trusted by that user.

In addition, application server 202 calculates a karma score for that user. As noted, given a user's email address or other unique IDs, application server 202 will return a reputation score as part of that user's karma. In addition, given two names or other unique IDs, application server 202 can provide a reputation score for one from the point of view of the others.

The reputation scores may be actively or passively determined. Active determine of reputation scores may be based primarily on explicit feedback provided by other users. Passive determination may be based primarily on passively monitoring the interaction of the user with the social network. For example, a user who has frequent and lengthy interactions with the social network may be assigned a relatively higher karma score. In addition, the karma scores corresponding to those other users that are frequently shared with may also be higher As another example, if recommendations or sharing activity is frequently distributed and accepted, that user may be assigned a higher karma score. One skilled in the art will recognize that there are many algorithms that may be used to calculate a karma score.

For example, given information about a person's name, their unique identifier assigned by application server 202, and associations to identity resources trusted by other users, application server 202 can generate a list of person names and identity resources (i.e., email address, account names, etc.), and the respective karma scores for that pairing.

Upon determining a user's karma scores, open overlay service 106 may then use these scores in various ways. For example, open overlay service 106 may publish the various karma scores of the user. This publishing may be on a small scale (published only to the social network), or on a large scale (published to all users of the social network service).

Open overlay service 106 may restrict or monitor the activities of users based on the karma scores. For example, a user who is discovered to be a spammer or fraud may be given a low karma score. As another example, a user with low karma scores may be restricted from certain social networks, viewing certain information about other users, or precluded from posting links or blogs. Meanwhile, a user with high karma scores may be given more preference in sharing activity.

Users of open overlay service 106 may also utilize the karma scores. For example, users may block activity from other users with low karma scores. Alternatively, users may prefer suggestions and recommendations from other users with high karma scores.

Figure 4:
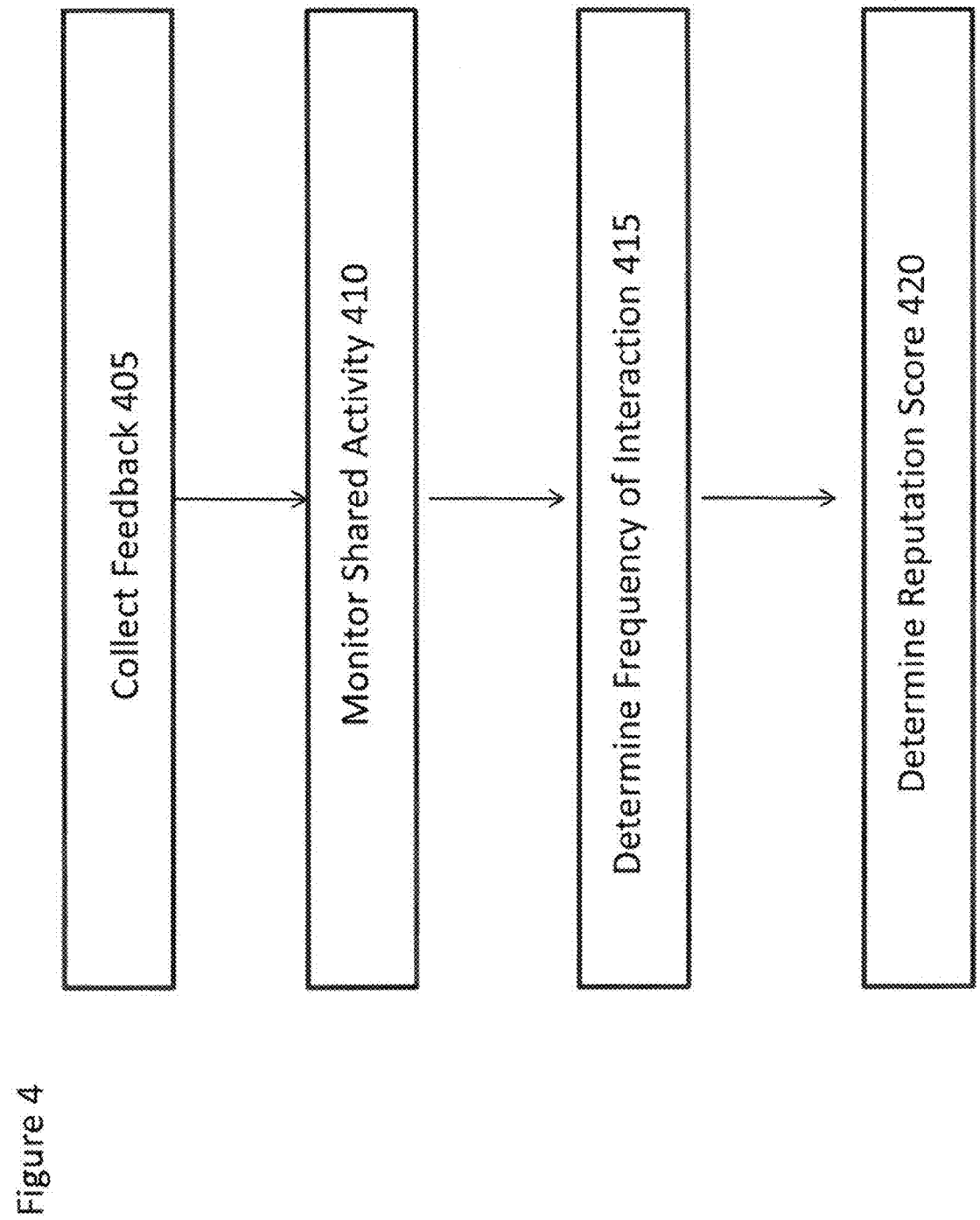
FIG. 4 illustrates an exemplary flow diagram that is consistent with the principles of the present invention.

FIG. 4 illustrates an exemplary flow diagram for calculating a combined reputation score for a user having a plurality of unique identities in a social network that is consistent with the principles of the present invention. At 405, collecting individual feedback about each unique identity of the user can be collected. The feedback can be provided by other users. At 410, sharing activity between each unique identity of the user and the other users within the social network can be monitored. At 415, a frequency of interactions between each unique identity of the user and each of the other users within the social network can be determined from the monitored sharing activity. At 420, the combined reputation score for the user based on the individual feedback provided by the other users and the frequency of interactions between each of the unique identities of the user and each of the other users can be determined by a processor.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of calculating a combined reputation score for a user having a plurality of unique identities in a social network, said method comprising:
    collecting individual feedback about each unique identity of the user, wherein the feedback is provided by other users;
    monitoring sharing activity between each unique identity of the user and the other users within the social network;
    determining, from the monitored sharing activity, a frequency of interactions between each unique identity of the user and each of the other users within the social network; and
    determining, by a processor, the combined reputation score for the user based on the individual feedback provided by the other users and the frequency of interactions between each of the unique identities of the user and each of the other users.

2. The method of claim 1, wherein monitoring sharing activity between each unique identity of the user and the other users comprises actively monitoring sharing activity between the user and the other users.

3. The method of claim 1, wherein monitoring sharing activity between each unique identity of the user and the other users comprises passively monitoring sharing activity between each unique identity of the user and the other users in the social network.

4. The method of claim 1, wherein the sharing activity comprises recommendations distributed by the user in the social network.

5. An apparatus for calculating a combined reputation score for each unique identity of a user having a plurality of unique identities in a social network, said apparatus comprising:
- a database adapted to store individual feedback about each unique identity of the user, wherein the feedback is provided by other users; and
- a processor adapted to collect the feedback provided by the other users; monitor sharing activity between each unique identity of the user and the other users within the social network; determine, from the monitored sharing activity, a frequency of interactions between each unique identity of the user and each of the other users within the social network; and determine the combined reputation score for the user based on the individual feedback provided by the other users and the determined frequency of interactions between each of the unique identities of the user and each of the other users.

6. A non-transitory computer readable storage medium comprising instructions for causing a computer to perform the method of claim 1.

* * * * *